US008342537B2

(12) United States Patent
Imai

(10) Patent No.: US 8,342,537 B2
(45) Date of Patent: Jan. 1, 2013

(54) METAL LAMINATE GASKET

(75) Inventor: Toshihiro Imai, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 19 days.

(21) Appl. No.: 12/659,204

(22) Filed: Mar. 1, 2010

(65) Prior Publication Data

US 2010/0225068 A1    Sep. 9, 2010

(30) Foreign Application Priority Data

Mar. 3, 2009   (JP) .................................. 2009-048995

(51) Int. Cl.
    *F16J 15/08*    (2006.01)
(52) U.S. Cl. ........................................ 277/594; 277/593
(58) Field of Classification Search ........... 277/590–595
    See application file for complete search history.

(56) References Cited

U.S. PATENT DOCUMENTS

| | | | | |
|---|---|---|---|---|
| 4,203,608 A | * | 5/1980 | Nicholson ...................... | 277/595 |
| 6,951,338 B2 | * | 10/2005 | Kestly ........................... | 277/593 |
| 7,131,649 B2 | * | 11/2006 | Sueda ............................. | 277/594 |
| 7,793,942 B2 | * | 9/2010 | Sakamoto ...................... | 277/593 |
| 7,913,386 B2 | * | 3/2011 | Werz et al. ..................... | 29/888.3 |
| 2006/0103077 A1 | * | 5/2006 | Sakamoto ...................... | 277/591 |
| 2006/0290072 A1 | * | 12/2006 | Chen et al. ..................... | 277/593 |
| 2007/0262536 A1 | * | 11/2007 | Werz et al. ..................... | 277/593 |
| 2010/0327540 A1 | * | 12/2010 | Okano et al. ................... | 277/592 |
| 2011/0095488 A1 | * | 4/2011 | Plunkett ......................... | 277/592 |

FOREIGN PATENT DOCUMENTS

JP          2008190542 A    *    8/2008

* cited by examiner

*Primary Examiner* — Gilbert Lee
(74) *Attorney, Agent, or Firm* — Manabu Kanesaka

(57) ABSTRACT

A metal laminate gasket includes a plurality of metal plates including a first metal plate having a first hole to be sealed and a bead around the first hole, and a second metal plate laminated under the first metal plate and having a second hole corresponding to the first hole. Concavities and convexities are formed at the second metal plate concentrically around the second hole for increasing an apparent plate thickness of the second metal plate. The concavities and convexities are provided continuously at a position corresponding to the foot portion or the top portion of the bead of the first metal plate. The concavities and convexities have a height and width smaller than those of the bead, and have a deformation characteristic due to a surface pressure when compressed, smaller than that of the bead.

2 Claims, 1 Drawing Sheet

METAL LAMINATE GASKET

BACKGROUND OF THE INVENTION AND RELATED ART STATEMENT

The present invention relates to a metal laminate gasket constituted by laminating a plurality of metal plates, wherein a surface pressure of a bead provided in a position to be sealed in an arbitrary metal plate among the plurality of metal plates, is increased.

Conventionally, the metal laminate gasket to which the bead is provided in the position where the laminated metal plates should be sealed, is quite-generally well known. The bead is effective for increasing a surface pressure on the bead thereof and performing a full sealing property; however, in order to increase the surface pressure thereof more and improve the sealing property, there is a limit even if the height or width of the bead, the curvature of a curved portion, and the like are revised. As a result, the plate thickness of the bead portion is required to increase by a shim and the like. However, if the metal plate such as the shim and the like is used, not only the metal plate with a required thickness has to be prepared but also the metal plate thereof has to be laminated in a required position at the time of assembly, so that the cost goes up.

In view of the conventional technique, the present invention has been made to increase the surface pressure of the bead portion in such metal laminate gasket without using the metal plate such as the shim and the like, and to improve the sealing property of the bead portion.

Further objects and advantages of the invention will be apparent from the following description of the invention.

SUMMARY OF THE INVENTION

In order to solve the above-mentioned problem, a metal laminate gasket according to the present invention comprises a plurality of metal plates including a first metal plate to which a bead is provided in a position to be sealed; and a second metal plate which is laminated on the first metal plate thereof. Concavities and convexities for increasing an apparent plate thickness are provided in a position corresponding to a foot portion or a top portion of the bead of the first metal plate in the second metal plate. The concavities and convexities have a height and width which are smaller than those of the bead, and a deformation due to a surface pressure which is smaller than that of the bead. The foot portion or the top portion of the bead is disposed on a flat portion wherein the plate thickness increases due to the concavity and convexity.

In a preferred embodiment of the metal laminate gasket according to the invention, the bead provided in the first metal plate can be a full bead or a half bead. Also, a rising angle of a rising portion of the metal plate in the concavities and convexities preferably have nearly a right angle compared to that of the rising portion in the bead, and a curved portion of the top portion of the concavity and convexity preferably includes a curvature larger than that of the curved portion in the bead. Moreover, the foot portion or the top portion of the bead in the first and third metal plates can be also disposed in the position corresponding to the concavities and convexities on both face sides of the second metal plate provided with the concavity and convexity.

In the metal laminate gasket including the above-mentioned structure, the concavities and convexities for increasing an apparent plate thickness are provided in the position corresponding to the foot portion or the top portion of the bead of the first meal plate in the second metal plate. The concavity and convexity have a height and width smaller than those of the bead, and accordingly, the concavity and convexity have rigidity higher than that of the bead, and the foot portion or the top portion of the bead is disposed on the flat portion wherein the plate thickness increases due to the concavities and convexities. As a result, an overall plate thickness of the bead portion increases so that a sealing property can improve.

According to the above-mentioned present invention, the surface pressure of the bead portion in the metal laminate gasket increases without using the metal plate such as the shim and the like, and the sealing property of the bead portion can improve.

DETAILED DESCRIPTION OF PREFERRED EMBODIMENTS

Figure 1:
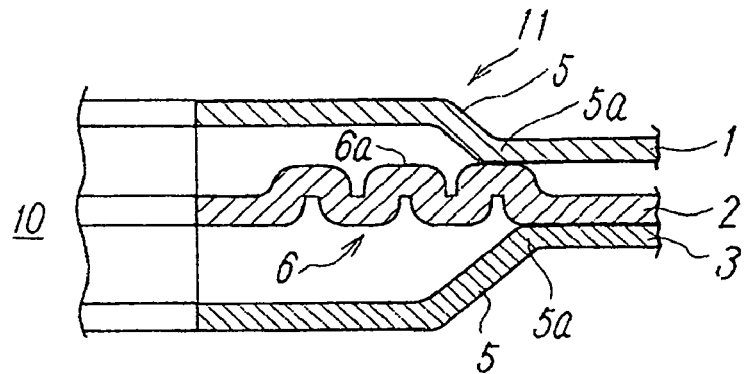
FIG. 1 is a cross-sectional view of essential parts of the first embodiment of a metal laminate gasket according to the present invention.

Hereinafter, embodiments of the metal laminate gasket according to the present invention will be explained in detail with reference to the drawings.

FIGS. 1 to 4 show different embodiments in a case wherein a metal laminate gasket according to the present invention is applied to a cylinder head gasket of an internal-combustion engine, and in each figure, a sealing portion 11 around a bore 10 corresponding to a cylinder bore is shown as a partial cross-sectional view in a radial direction of the bore 10, and the other structures are the same as those of a well-known cylinder head gasket, so that those structures are omitted.

The metal laminate gasket of the above-mentioned each embodiment basically comprises laminated plural sheets (2 to 3 sheets) of metal plates, and a bead (half bead or full bead) 5 is provided in the position to be sealed in other metal plates except for at least one sheet of the metal plates. Concavities and convexities 6 for increasing an apparent plate thickness are arranged concentrically relative to a hole to be sealed, i.e. bore 10, at a position corresponding to a foot portion 5a or a top portion 5b of the bead in the remaining metal plates. Each of the concavities and convexities 6 extends continuously around the bore 10.

Figure 2:
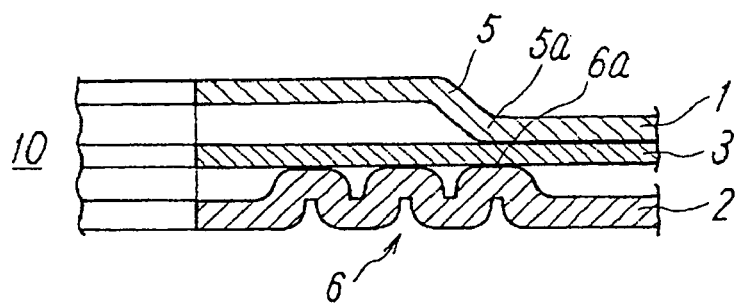
FIG. 2 is a cross-sectional view of the essential parts of the second embodiment of the metal laminate gasket according to the present invention.
Figure 3:
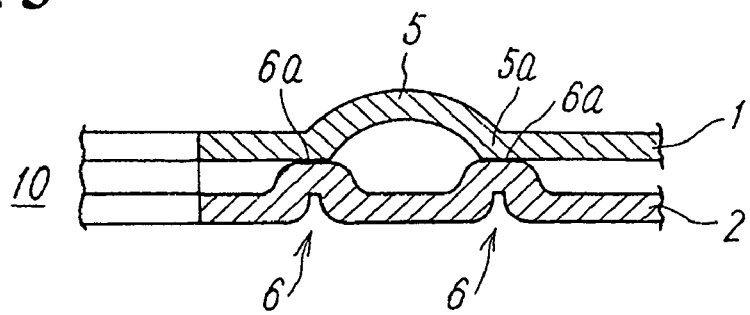
FIG. 3 is a cross-sectional view of the essential parts of the third embodiment of the metal laminate gasket according to the present invention.
Figure 4:
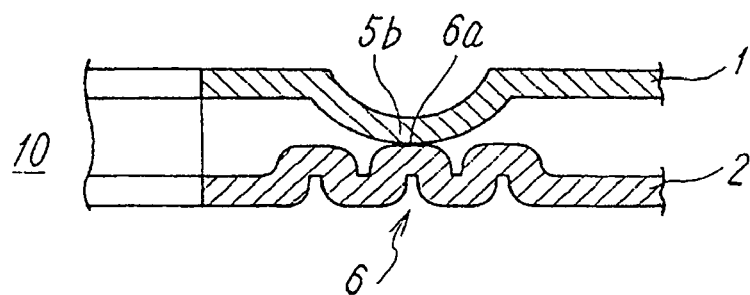
FIG. 4 is a cross-sectional view of the essential parts of the fourth embodiment of the metal laminate gasket according to the present invention.

Specifically, the metal laminate gasket shown in FIGS. 1, 2 shows a case wherein the bead 5 provided in the first metal plate 1 is the half bead, and the metal laminate gasket shown in FIGS. 3, 4 shows a case wherein the bead 5 provided in the first metal plate 1 is the full bead. Also, FIGS. 1 to 3 show a case wherein the concavities and convexities 6 are provided in the second metal plate 2 by corresponding to the foot portions 5a of the bead 5 of the first metal plate 1, and FIG. 4 shows a case wherein the concavities and convexities 6 are provided in the second metal plate 2 by corresponding to the top portion 5b of the bead 5 of the first metal plate 1.

In addition, specifically, the metal laminate gasket of the first embodiment shown in FIG. 1 includes the first to third metal plates 1 to 3, and a bead (half bead) 5 is provided respectively in the position to be sealed in the first metal plate 1 and the third metal plate 3. In the metal plate 2 to which the first metal plate 1 and the third metal plate 3 are laminated, the concavities and convexities 6 for increasing the apparent plate thickness are provided in the position corresponding to the foot portions 5a of the bead 5 of the first and third metal plates 1, 3.

The concavities and convexities 6 differ from the bead which is presumed to be elastically deformed, and are formed by, for example, a coining process and the like. Heights and widths of the concavities and convexities 6 are enough smaller than those of the bead 5, and the deformation due to a surface pressure is made very smaller than that of the bead 5. As shown in the figures, a plurality of concave portions and convex portions is formed so as to be disposed as needed, and flat portions 6a wherein the plate thickness increases due to the concavities and convexities 6, are formed. A rising portion of the metal plate in the concavities and convexities 6 has nearly a right angle of a rising angle compared to that of the rising portion of the bead 5, and a curved portion of the top portion forming the flat portions 6a of the concavities and convexities includes a curvature larger than that of the curved portion in the bead 5. Then, in the first embodiment, the foot portions 5a of the beads 5 are disposed on the flat portions 6a.

The beads 5 provided in the first and third metal plates 1, 3 can be a full bead; and in this case, the other foot portions are also disposed on the concavities and convexities formed in the second metal plate 2.

The metal laminate gasket of the second embodiment shown in FIG. 2 includes the first metal plate 1 to which the bead 5 is provided in the position to be sealed, and the second metal plate 2 laminated on the first metal plate 1 via the third metal plate 3, and the concavities and convexities 6 for increasing the apparent plate thickness are provided in the position corresponding to the foot portion 5a of the bead 5 of the first metal plate 1 in the second metal plate 2. The concavities and convexities 6 are the same as those explained relating to the first embodiment.

In the second embodiment, the foot portion 5a of the bead 5 is disposed on the flat portions 6a wherein the plate thickness increases due to the concavities and convexities 6 via the third metal plate 3. However, compared to the case wherein the foot portion 5a of the bead 5 is disposed directly on the concavities and convexities 6, there is no particular difference for an improvement effect of the sealing property of the bead portion.

The metal laminate gasket of the third embodiment shown in FIG. 3 comprises the first metal plate 1 to which the bead (full bead) 5 is provided in the position to be sealed, and the second metal plate 2 which is laminated on an opposite face side of a projected face side of the bead 5. The concavities and convexities 6 for increasing the apparent plate thickness are provided in the position corresponding to both foot portions 5a of the bead 5 of the first metal plate 1 in the second metal plate 2, and both foot portions 5a of the bead 5 are disposed on the flat portions 6a wherein the plate thickness due to the concavities and convexities c.

The other structures and operations are the same as those in the case of the first embodiment.

The metal laminate gasket of the fourth embodiment shown in FIG. 4 comprises the first metal plate 1 wherein the bead (full bead) 5 is provided in the position to be sealed, and the second metal plate 2 which is laminated on the projected face side of the bead 5 thereof. The concavities and convexities 6 for increasing the apparent plate thickness are provided in the position wherein the top portion 5b of the bead 5 of the first metal plate 1 in the second metal plate 2 abuts, and the top portion 5b of the bead 5 is disposed on the flat portions 6a wherein the plate thickness increases due to the concavities and convexities 6.

The other structures and operations are the same as those in the case of the first embodiment. Also, in the case of the third embodiment and the present embodiment, the other third metal plate can be also laminated between the first and second metal plates 1, 2, or on the external face.

In the metal laminate gasket of each embodiment including the above-mentioned structure, the concavities and convexities 6 for increasing the apparent plate thickness are provided in the position corresponding to the foot portions 5a or the top portion 5b of the bead 5 of the first (and the third) metal plate 1 in the second metal plate 2. The concavities and convexities 6 have a height and width smaller than those of the bead 5, and accordingly, the concavities and convexities 6 have rigidity higher than that of the bead 5, and the foot portions 5a or the top portion 5b of the bead 5 is disposed on the flat portions 6a wherein the plate thickness increases due to the concavities and convexities 6. As a result, the plate thickness of the bead portion increases without using the metal plate such as the shim and the like so that the sealing property can be effectively improved.

Also, in the metal laminate gasket of the first to fourth embodiments including such structure, the foot portions 5a or the top portion 5b of the bead 5 are disposed on the concavities and convexities 6 which are provided in the other metal plates, so that any ancillary structure never be additionally provided on both sides of the bead such that the width of the bead is enlarged in order to improve the sealing property of the bead portion. As a result, the concavities and convexities 6 are structured so as to be housed within the width of the bead as much as possible, so that the concavities and convexities 6 can be effectively used for sealing the portion wherein the size of a space between bores and the like is limited.

The disclosure of Japanese Patent Application No. 2009-048995, filed on Mar. 3, 2009, is incorporated in the application.

While the invention has been explained with reference to the specific embodiments of the invention, the explanation is illustrative and the invention is limited only by the appended claims.

What is claimed is:

1. A metal laminate gasket comprising:
 a plurality of metal plates including a first metal plate having a first hole to be sealed and a bead around the first hole, and a second metal plate laminated under the first metal plate and having a second hole corresponding to the first hole, said bead having a top portion and at least one foot portion, and
 concavities and convexities continuously formed at the second metal plate concentrically around the second hole for increasing an apparent plate thickness of the second metal plate,
 wherein said concavities and convexities have a height and width smaller than those of said bead, and have a deformation characteristic due to a surface pressure when compressed, smaller than that of the bead, and
 wherein the foot portion or the top portion of said bead is disposed on a top flat portion of one of the convexities of the second metal plate without an empty space with respect to the top flat portion when the first and second metal plates are assembled so that the foot portion or the top portion of said bead is supported by the top flat portion of one of the convexities for increasing the surface pressure of a bead portion, and wherein the foot portion of said bead is directly supported by the top flat portion of one of the convexities of the second metal plate for increasing the surface pressure of the bead portion.

2. A metal laminate gasket comprising:

a plurality of metal plates including a first metal plate having a first hole to be sealed and a bead around the first hole, and a second metal plate laminated under the first metal plate and having a second hole corresponding to the first hole, said bead having a top portion and at least one foot portion, and concavities and convexities continuously formed at the second metal plate concentrically around the second hole for increasing an apparent plate thickness of the second metal plate, wherein said concavities and convexities have a height and width smaller than those of said bead, and have a deformation characteristic due to a surface pressure when compressed, smaller than that of the bead, and wherein the foot portion or the top portion of said bead is disposed on a top flat portion of one of the convexities of the second metal plate without an empty space with respect to the top flat portion when the first and second metal plates are assembled so that the foot portion or the top portion of said bead is supported by the top flat portion of one of the convexities for increasing the surface pressure of a bead portion, and wherein the top portion of said bead is directly supported by the top flat portion of one of the convexities of the second metal plate for increasing the surface pressure of the bead portion.

* * * * *